(12) United States Patent
Legrand

(10) Patent No.: US 10,489,413 B2
(45) Date of Patent: Nov. 26, 2019

(54) HANDLING DATA REQUESTS

(71) Applicant: Amadeus S.A.S., Biot (FR)

(72) Inventor: Guillaume Legrand, Waltham, MA (US)

(73) Assignee: AMADEUS S.A.S., Biot (FR)

( * ) Notice: Subject to any disclaimer, the term of this patent is extended or adjusted under 35 U.S.C. 154(b) by 541 days.

(21) Appl. No.: 14/816,710

(22) Filed: Aug. 3, 2015

(65) Prior Publication Data

US 2017/0039251 A1    Feb. 9, 2017

(51) Int. Cl.
  *G06F 17/00*    (2019.01)
  *G06F 7/00*    (2006.01)
  *G06F 16/2458*    (2019.01)
  *G06F 16/2457*    (2019.01)

(52) U.S. Cl.
  CPC .... *G06F 16/2474* (2019.01); *G06F 16/24578* (2019.01)

(58) Field of Classification Search
  CPC .................. G06F 17/30548; G06F 17/3053
  USPC .................................................. 707/695
  See application file for complete search history.

(56) References Cited

U.S. PATENT DOCUMENTS

| | | | | |
|---|---|---|---|---|
| 8,521,774 B1 * | 8/2013 | Cai | ................... | G06F 17/30457 707/776 |
| 8,972,391 B1 * | 3/2015 | McDonnell | ............. | H04L 67/10 707/727 |
| 9,213,780 B2 * | 12/2015 | Azar | ................. | G06F 16/24545 |
| 2003/0200194 A1 * | 10/2003 | Arnold | ............. | G06F 16/24552 707/999.001 |
| 2003/0225755 A1 * | 12/2003 | Iwayama | ............. | G06F 16/355 707/999.003 |
| 2004/0249683 A1 * | 12/2004 | Demarcken | ....... | G06F 16/24539 705/5 |
| 2009/0204753 A1 * | 8/2009 | Bridge, Jr. | ............ | G06F 12/122 711/106 |
| 2009/0228446 A1 | 9/2009 | Anzai | | |

(Continued)

FOREIGN PATENT DOCUMENTS

WO    9922315 A1    5/1999

OTHER PUBLICATIONS

European Patent Office, European Search Report and Written Opinion issued in corresponding Application No. 15290199.7, dated Feb. 16, 2016.

(Continued)

*Primary Examiner* — Pavan Mamillapalli
(74) *Attorney, Agent, or Firm* — Thompson Hine LLP

(57) ABSTRACT

Handling data requests directed to a database environment including a first platform, a second platform, and a control unit. The control unit receives a request, determines a prepared result corresponding to the data request and compares an update indicator of the determined prepared result with a threshold value. In response to the comparison, the control unit either retrieves the prepared result from the second platform and returns it or retrieves an updated version of the at least one prepared result from the first platform, updates the prepared result in the second platform and the associated update indicator, and returns the updated version of the prepared result. The update indicator may be defined by (1−acc)·t, wherein acc is a probability that the associated prepared result is valid and t is an age of the associated prepared result.

21 Claims, 11 Drawing Sheets

(56) References Cited

U.S. PATENT DOCUMENTS

| | | | | |
|---|---|---|---|---|
| 2010/0174861 A1* | 7/2010 | Katz | .................. | G06F 16/9574 |
| | | | | 711/113 |
| 2010/0332513 A1* | 12/2010 | Azar | ................ | G06F 17/30902 |
| | | | | 707/769 |
| 2011/0184936 A1* | 7/2011 | Lymberopoulos | .......................... | |
| | | | | G06F 17/30902 |
| | | | | 707/721 |
| 2011/0295844 A1* | 12/2011 | Sun | ....................... | G06Q 10/00 |
| | | | | 707/723 |
| 2015/0033255 A1* | 1/2015 | Neumann | ........ | H04N 21/25891 |
| | | | | 725/34 |

OTHER PUBLICATIONS

Junghoo Cho et al: "Synchronizing a database to improve freshness", Proceedings of the 2000 ACM SIGMOD International Conference on Management of Data, May 16-18, 2000, Dallas, Texas, USA; [ISSAC. Proceedings of the International Symposium on Symbolic and Algebraic Com v'ol. 29, No. 2. May 16, 2000 (May 16, 2000), pp. 117-128.

Deborah Steiner et al: "Oracle Cache. Administration Deployment Release. 1.0.2.3", Web Guide, Mar. 2, 2001 (Mar. 2, 2001), pp. 1-198.

European Patent Office, extended European search report issued in Application No. 181756693 dated Jun. 25, 2018.

\* cited by examiner

HANDLING DATA REQUESTS

BACKGROUND

The present invention generally relates to database technology and, more specifically, is directed to a methods and systems for handling incoming data requests considering the accuracy of prepared results to be returned to a data request.

A common problem in database technology is to ensure short response times to database queries or requests which require complex, long and resource-intensive processing, e.g., due to large volumes of data. For example, such computing-power consuming processing has to be performed in response to so-called "open queries" which contain only little input information (e.g., only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the complex, long and resource-intensive processing in order to respond to such queries.

A general approach to shorten response times is to prepare results to be returned in response to expected requests (e.g., by pre-computing or pre-collecting such results) and to maintain the corresponding query results in a pool of prepared results. Requests are then actually not processed and responses on the basis of the large original data basis, but are directed to the pool of prepared results.

Another issue, however, which accompanies such result preparing approaches, is to keep the prepared results up-to-date in order to ensure that prepared results returned in response to data requests correctly reflect the outcome of a complex, long and resource-intensive processing. In case the underlying original data basis changes, the prepared results get outdated and answering requests on the basis of the pool of prepared results would deliver incorrect prepared results. Thus, update strategies are employed to keep the pool of prepared results up-to-date.

Various relatively simple update strategies are known in the prior art like, for example, re-computing the entire domain of prepared results frequently, establishing and maintaining re-computation schedules manually and re-computing prepared results when they are getting too old.

Improved methods and systems are needed for handling incoming data requests considering the accuracy of prepared results to be returned to a data request.

SUMMARY

According to one aspect, a method for handling data requests directed to a database environment is provided. The database environment has a least one first platform providing original results to be stored in a second platform as prepared results. The second platform maintains a pool of the prepared results having been prepared via the first platform in order to be returned to data requests. The database environment further has a control unit for processing the data requests directed to the database environment. Each prepared result maintained in the pool of the second platform is associated with an update indicator being a measure that the associated prepared result kept in the pool of the second platform is to be updated. The control unit receives a data request. The control unit determines at least one prepared result corresponding to the data request. The control units compares the update indicator of the determined prepared result corresponding to the data request with a threshold value. If the comparison indicates a requirement to update the prepared result, the control unit retrieves an updated version of the at least one prepared result from the first platform. The control unit updates the prepared result in the pool of the second platform and the associated update indicator based on the updated version of the at least one prepared result. The control unit returns the updated version of the at least one result. On the other hand, if the comparison does not indicate a requirement to update the at least one prepared result, the control unit returns the at least one determined prepared result. The update indicator is defined by $(1-acc) \cdot t$, wherein $acc$ is a probability that the associated prepared result is valid and $t$ as an age of the associated prepared result.

In this way, the accuracy of the prepared results (i.e., the prepared results are still in line with the original response data) is enhanced in the long term, as will be explained in detail below.

According to a second aspect, a control unit being arranged accordingly is provided.

According to a third aspect, a computer program to be executed by a control unit and enabling the control unit with respective functionality is provided.

BRIEF DESCRIPTION OF SEVERAL VIEWS OF THE DRAWINGS

The subsequent description of embodiments is based on the accompanying set of figures in which similar reference numerals refer to similar elements and messages.

DETAILED DESCRIPTION

The methodologies described herein relate to database systems that offer prepared results to clients requesting data from a database system. A technical aim of preparing results before they are requested from clients is generally to decrease response times for responding to such data requests. Hereinafter, the term "prepared" is used to relate any sort of pre-processing, pre-computation and pre-collection of results in an asynchronous manner, i.e., independently from and prior to a data request from a client. Examples for a preparation of results are Internet crawlers collecting or copying the content of Internet web servers as well as results generated in response to earlier data requests that are maintained in a cache for fast retrieval, but also complex and time-intensive computations of search results on the basis of underlying data. The term "database" is meant to encompass any types of structured information storage system such as standard stand-alone databases like SQL server or Oracle databases as well as complex, distributed and/or proprietary storage systems, relational databases including database management systems or object-oriented database systems and the like. The term "data request" is used herein as a general term for any types of inquiries to a database system in order to retrieve data including any type of information retrieval requests such as transactional queries, requests for batch computations, SQL queries and other forms.

Figure 1:
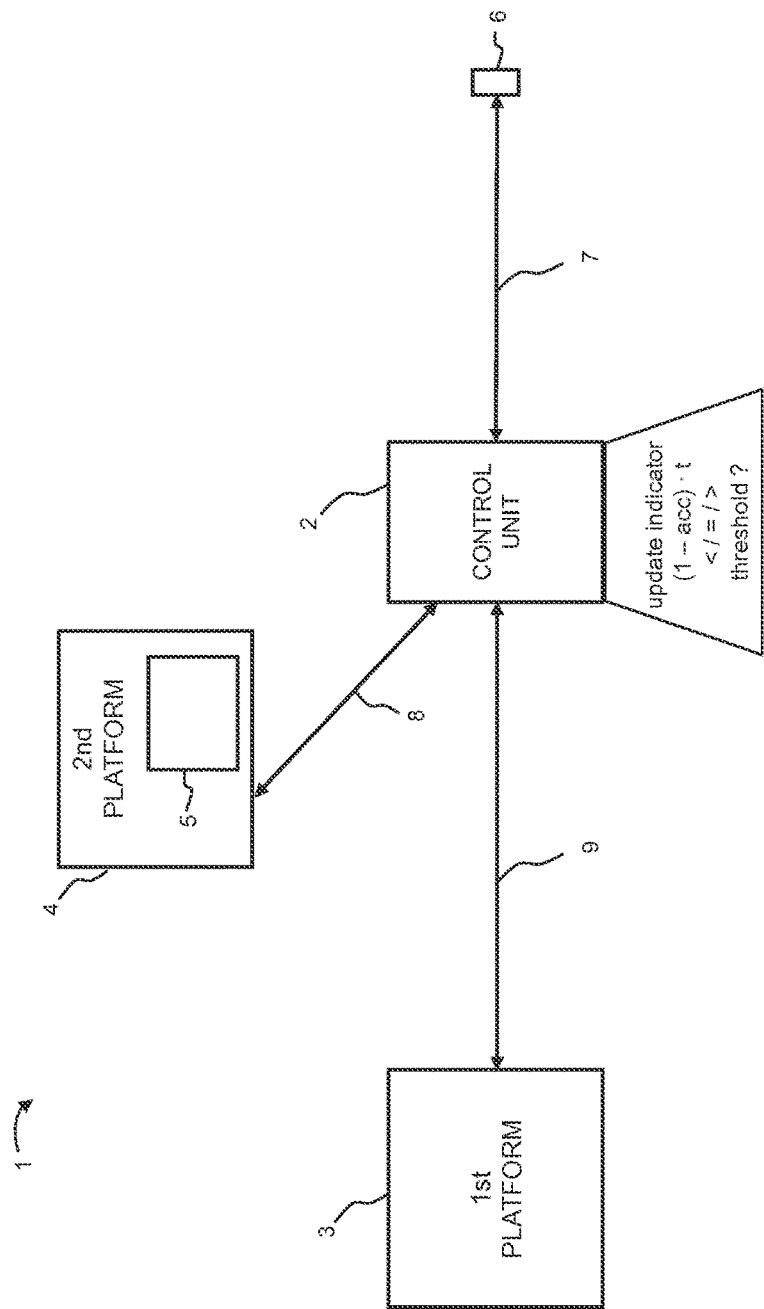
FIG. 1 is a high-level schematic overview of the system architecture as described herein.

FIG. 1 illustrates such a database environment 1 at an abstract level. Original data, hereinafter also referred to as original results, are provided by a first platform 3. In general, the first platform 3 is either an original data source itself, such as an inventory database or a database maintaining any kind of original and generally valid results, or accesses one or more original data sources in order to prepare original results. Examples of the latter kind are a search engine accessing Internet websites and a computation platform computing priced travel recommendations based on fares stored in a fare database. If the first platform 3 generates/computes/collects the original results by accessing other/further original data sources in order to prepare original results, the first platform 3 provides results which generally accurately reflect the current content of the original response data. More than one first platform 3 can be present in the database environment 1.

The database environment 1 further includes a second platform 4 which maintains a pool 5 of results which have been prepared via the first platform 3. The second platform 4 is e.g., a cache that caches results having been retrieved via the first platform 3, or the second platform 4 is e.g., a server holding a repository of the content of crawled websites, or the second platform 4 is e.g., a search platform maintaining pre-computed priced travel recommendations.

In general, the first platform 3 providing original response data and the second platform 4 maintaining the pool 5 of prepared results differ from each other in technical terms as follows: The second platform 4, due to the preparation of the results, provides a cheaper (in terms of computation costs) and/or faster access to the results compared to the first platform 3. This relation between the first platform 3 and the second platform 4 can also be expressed the other way around, i.e., the first platform 3 generally responds more slowly and responses from the first platform 3 involve higher computation costs than responses from the second platform 4 because the first platform 3 still has to prepare the results (e.g., retrieve the requested content from the original Internet website, or compute the requested priced travel recommendations on the basis of fares kept in a fare database). As the computation resources of the first platform 3 are limited, the number of accesses to the first platform 3 should be kept within a certain limit. For example, CPU consumption or memory load of the first platform 3 must not exceed a given limit. This constraint may be translated into a limit of the number of accesses to the first platform per time unit (e.g., 10 accesses per second). For these reasons, the first platform 3 is not solicited each time in order to respond to data requests. Rather, responses are generally formed by utilizing the prepared results stored in the pool 5 of the second platform 4. In this way, the second platform 4 acts as a shield in front of the first platform 3, thereby reducing the load on the (computationally expensive) first platform 3.

On the other hand, however, the prepared results stored in the pool of the second platform 4 are not necessarily perfectly synchronized with the original results provided by the first platform 3. In general, the prepared results of the second platform 4 represent older versions of original result being provided by the first platform 3 and the respective version of the original result provided by the first platform 3 might have changed since the last update of the corresponding prepared result maintained in the second platform 4. Furthermore, the second platform 4 does not necessarily store prepared results corresponding to all existing original results, i.e., prepared results might be missing in the second platform 4. Prepared results stored in the pool 5 of the second platform 4 which correctly reflect their corresponding result provided by the first platform are hereinafter referred to as valid prepared results or as accurate prepared results, while outdated prepared results stored in the pool 5 of the second platform 4 are referred to as invalid prepared results or inaccurate prepared results.

Thus, a technical problem arises to maximize the accuracy and validity of the prepared results stored in the pool 5 of the second platform 4 and the accuracy and validity of prepared results returned to inquiring clients, respectively, i.e., to maintain prepared results in the second platform 4 that are consistent with the original response data provided by the first platform 3 as much as possible, in order to respond to data request with a high portion of valid prepared results.

The database environment 1 is further coupled to at least one, but generally a plurality of clients 6. Clients 6 such as applications on user terminals retrieve results from the database environment 1 by directing data requests to the database environment 1 via an interface 7. The technical characteristics of the interface 7 depend on the particular implementation of the database environment 1. For example, the interface 7 encompasses wireless communication including 2G/3G/4G (including packet-oriented mobile data exchange as well as SMS) and/or WiFi communication in the case the client 6 is situated on a mobile communications device. Alternatively or in addition, the interface 7 features wired communication using standard network protocols employed in local area networks and/or wide area networks including the Internet such Ethernet, TCP/IP, SMTP with POP3 or IMAP, HTTP, webservice-related protocols such as SOAP, etc.

A data request transmitted from a client 6 via interface 7 includes one or more retrieval criteria constraining the request. For example, if the data request is an Internet search request, the data request might carry a search string, search text or search phrase as search criteria. A further search criterion may be the language of websites to be searched or an indication of a point of time of the first availability of the requested search string, search text or search phrase. According to another example, the data request is a database request for a product or service offered by a service provider platform such as an Internet book store or a travel provider. In that case, the data request might include e.g., an upper price limit or a price range for the service or product and desired characteristics of the product/service such as book title, travel origin and destination, etc.

Data requests issued by a client 6 are received by a further entity of the database environment 1, the control unit 2 (FIG. 1). In general, the control unit 2 processes incoming data requests in order to device whether response results are retrieved from the second platform 4 and/or the first platform 3. To this end, the control unit functions as an intermediate unit controlling the data flow within the database environment 1 and the results to be returned to the client 6.

Basically, controlling the data flow by the control unit 2 takes into account the two following aspects: On the one hand, as already explained above, retrieving prepared results fulfilling the request criteria included in a data request from the pool 5 of the second platform 4 has the advantage of a faster response time (compared to generating the results by the first platform 3) and relieves the first platform 3 from potential overloads. On the other hand, however, serving a data request by retrieving original results provided by the first platform 3 allows to update the respective prepared results maintained in the pool 5 of the second platform 4. Thus, a portion of results to be returned in response a data requests can be intentionally retrieved from the first platform 3, although corresponding prepared results are available in the second platform 4. These results are thus newly prepared by the first platform 3 and returned to the requesting client 6 and stored in the pool 5 of the second platform 4 thereby updating the corresponding prepared results.

The technical problem is then to decide which portions of the data requests being transmitted from the clients 6 to the control unit 2 are to be responded on the basis of the pool 5 of the second platform 4 and which portions of the data requests are to be responded on the basis of the first platform 3 in order to update the prepared results maintained in the pool 5 of the second platform 4.

To this end, the control unit 2 utilizes an update indicator which is associated with each prepared result maintained in the pool 5 of the second platform 4. In general, the update indicator is a measure whether or not the associated prepared result kept in the pool 5 of the second platform 4 needs to be updated. The update indicator is defined by $(1-acc) \cdot t$ (cf. FIG. 1), wherein acc is a probability that the associated prepared result is valid and t is an age of the associated prepared result. Before turning to the message sequences involved in the processing of and responding to a data request, the nature of the update indicator is elaborated in more detail first.

A given prepared result i kept in the pool 5 of the second platform 4 can be specified by the following parameters.

The age $t_i$ of the prepared result i denotes the time since the first preparation or the last update (whichever occurred last) of the prepared result i via the first platform 3. The age $t_i$ can be calculated dynamically at a given point of time by computing the time interval since the last preparation of the prepared result i (current time minus time of last preparation/update). To this end, the timestamp of the most recent preparation of the prepared result is stored in order to compute the age $t_i$ of the prepared result i when necessary.

The probability $acc_i$ that the prepared result i is valid. This probability can be predicted by a probabilistic model modeling the validity behavior of prepared results. An example of such a model is based on a validity rate of a prepared result i which is described next.

The validity rate $\lambda_i$ of the prepared result i is an indicator of how frequently the result i prepared by the first platform 3 changes and thus how fast the prepared result i stored in the pool 5 of the second platform 4 becomes invalid due to changes of the result i provided by the first platform 3 (e.g., due to changes of the data kept by the first platform 3 or by changes in data kept by other data sources on the basis of which the first platform 3 computes the result i). This validity rate $\lambda_i$ of a given prepared result i is, for example, statistically derived from the occurrence and the outcomes of past preparations and updates and comparisons of the updated prepared result i with its previous state or values in order to determine whether the prepared result i with age $t_i$ was still valid (its state or value is not changed by the update) or whether the prepared result i with age $t_i$ was invalid (its state or value is changed by the update). For example, it has been determined that a particular prepared result i has a validity rate $\lambda_i$ of 10% per hour meaning that the probability of i being valid decreases by 10% every hour. At the time of an update of the prepared result i, i is generally 100% valid. After one hour, i is valid with a probability of 90%. After two hours the validity of i is 81% (=90% decreased by another 10%). After three hours, i's probable validity is at 72.9%, and so on.

Figure 3:
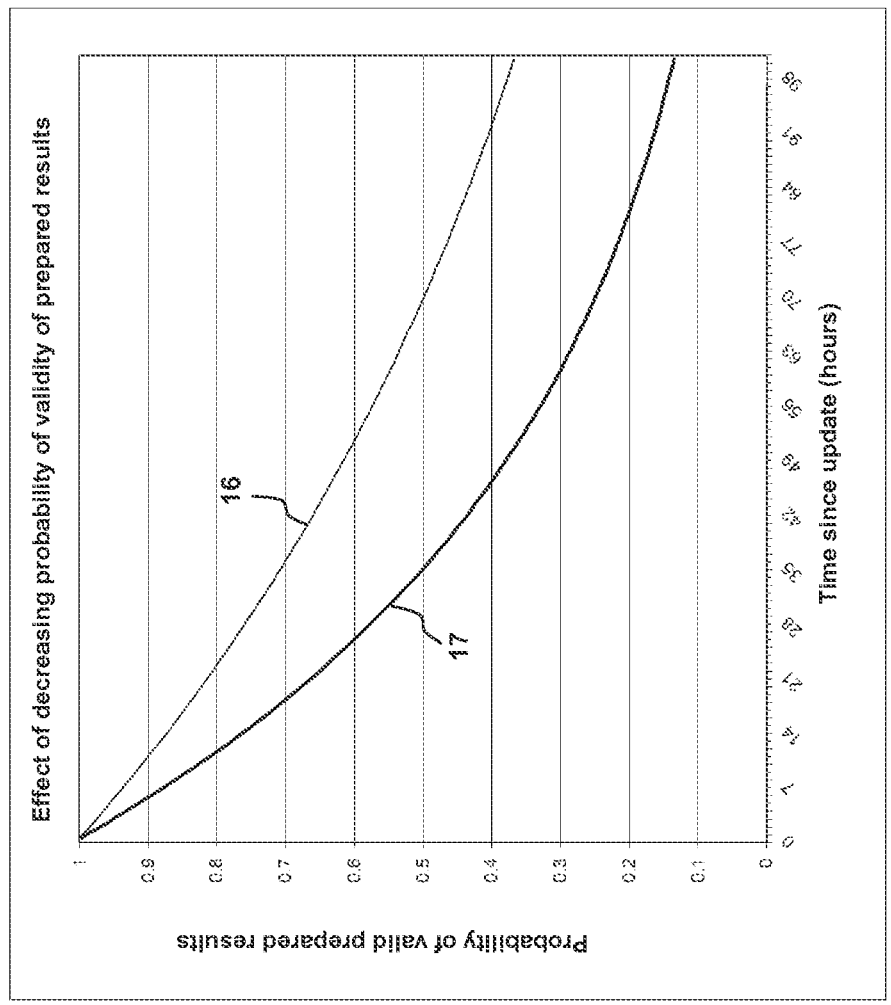
FIG. 3 represents an effect of decreasing validity probability of prepared results.

As mentioned above, the validity rate $\lambda_i$ can be employed to provide an estimate of the probability for a prepared result to stay valid after a given time P (unchanged after t)=$e^{-\lambda_i t}$ which, in some embodiments, is considered to be the probability of a prepared result being valid or, in other words, not being outdated $acc_i = e^{-\lambda_i t_i}$. Two exemplary functions of this probable accuracy decreasing over time are depicted by FIG. 3. Function 16 represents a prepared result which potentially remains more accurate (or, more correctly, stays at a higher probability of being valid over time) than another prepared result associated with function 17. For example, the prepared result represented by function 16 has 70% probability of being still valid at 35 hours after its last re-computation, while the other prepared result characterized by function 17 is only valid up to about 50% at 35 hours after its latest re-computation. Functions 16 and 17 may also represent whole sets of prepared results and then indicate proportions of the sets of prepared results likely being valid at a time passed since the last update of the set.

The popularity $p_i$ of the prepared result i is an average access frequency to this prepared result by the clients 6 via interface 7. Some embodiments aim at achieving a better accuracy for these prepared results which are more often requested by the clients 6 than other prepared results.

The update cost $c_i$ relates to computation resources (such as the amount of CPU time, but also encompassing e.g., network resources required e.g., to collect original response data from other sources as mentioned above) of the first source to update the prepared result i. In some embodiments, indications of $c_i$ for different prepared results are available (e.g., from previous updates). In this case, the update cost parameter can be used to favor updating prepared results requiring less computation resources than other prepared results in order to update more prepared results. Otherwise, an assumption can be made that all prepared results have the same update costs. In any case, in some embodiments, the update cost parameter is used to limit the number of updates per time unit to the amount of computing resources available at the first platform 3, i.e., $\Sigma_{i\ updated}\ c_i \le$ Resources for each unit of time.

With these parameters, the validity probability of the prepared results stored in the pool 5 of the second platform 4 can be defined as follows.

The validity probability of all prepared results kept in the pool 5 of the second platform 4 can be considered as the mean validity, also referred to as "global accuracy", which is defined by $$\text{Global Accuracy} = \frac{1}{N} \sum_{i \in pool} acc_i$$

with N being the number of prepared results stored in the pool 5 of the second platform 4.

Now introducing the above-mentioned exemplary probabilistic model based on the validity rate $\lambda_i$, the global accuracy is given by:

$$\text{Global Accuracy} = \frac{1}{N} \sum_{i \in pool} e^{-\lambda_i t_i}$$

The validity probability of the prepared results in the pool 5 of the second platform 4 from the perspective of the clients 6 (also referred to as "user accuracy") is then defined in that each validity probability value is weighted by the popularity of the respective prepared result. Thus, the proportion of probably accurate client accesses to the prepared results as opposed to the expected proportion of accurate prepared results is:

$$\text{User Accuracy} = \sum_{i \in pool} \frac{p_i}{p_{tot}} acc_i = \sum_{i \in pool} \frac{p_i}{p_{tot}} e^{-\lambda_i t_i}$$

wherein $p_{tot}$ is defined as the sum of all $p_i$.

The update indicator utilized by the control unit 2 to decide whether to return prepared results maintained in the pool 5 of the second platform 4 or whether to retrieve updated prepared results from the first platform 3 in order to both, return the updated results to the requesting client 6 as well as update the respective prepared results in the pool 5 of the second platform 4 thereby increasing the validity of the prepared results in the second platform 4 is formed by these parameters assigned to each of the prepared results in the second platform 4. In the most basic form, the update indicator described herein is given by $(1-acc) \cdot t$, for a particular prepared result i by $(1-acc_i) \cdot t_i$. On some embodiments, refined definitions based on this basic form are utilized, such as $$\frac{(1-acc) \cdot t}{c}, \text{ or } \frac{p \cdot (1-acc) \cdot t}{c}.$$

These variations of the update indicators and their technical significance are explained in more detail further below.

Irrespective which of the aforementioned definitions of the update indicator is utilized, the control unit 2 employs the update indicator as follows (see FIG. 2A and FIG. 2B).

The control unit 2 receives a data request 30 from a client 6. Then, the control unit 2 determines at least one prepared result corresponding to the data request 30 (activity 31). Thus, the control unit 2 processes the data request 30, determines the data retrieval criteria included in the data request 30 (examples have already been given above) and identifies a number of prepared results which fulfill the data retrieval criteria. The specific manner how these prepared results fulfilling the data retrieval criteria are identified by the control unit 2 depends on the architecture of the database environment 1 (a particular example is given further below with reference to FIGS. 4 and 5). For example, in the case of the data request 30 being an SQL query, the control unit 2 determines the query parameters indicated the SQL query and retrieves identification information identifying prepared results (e.g., primary key values) fulfilling the query parameters of the SQL query from the second platform 4 or another module existing within the database environment 1 for that purpose.

This determination of prepared results fulfilling data retrieval criteria of the data request 30 does not necessarily include a retrieval of the content of the prepared results, yet. Rather, it is sufficient to identify these prepared results e.g., on unique identifiers such as their primary key values. In some embodiments, however, activity 31 already encompasses retrieval of the content of the prepared results fulfilling data retrieval criteria of the data request 30 from the second platform 4.

Figure 2A:
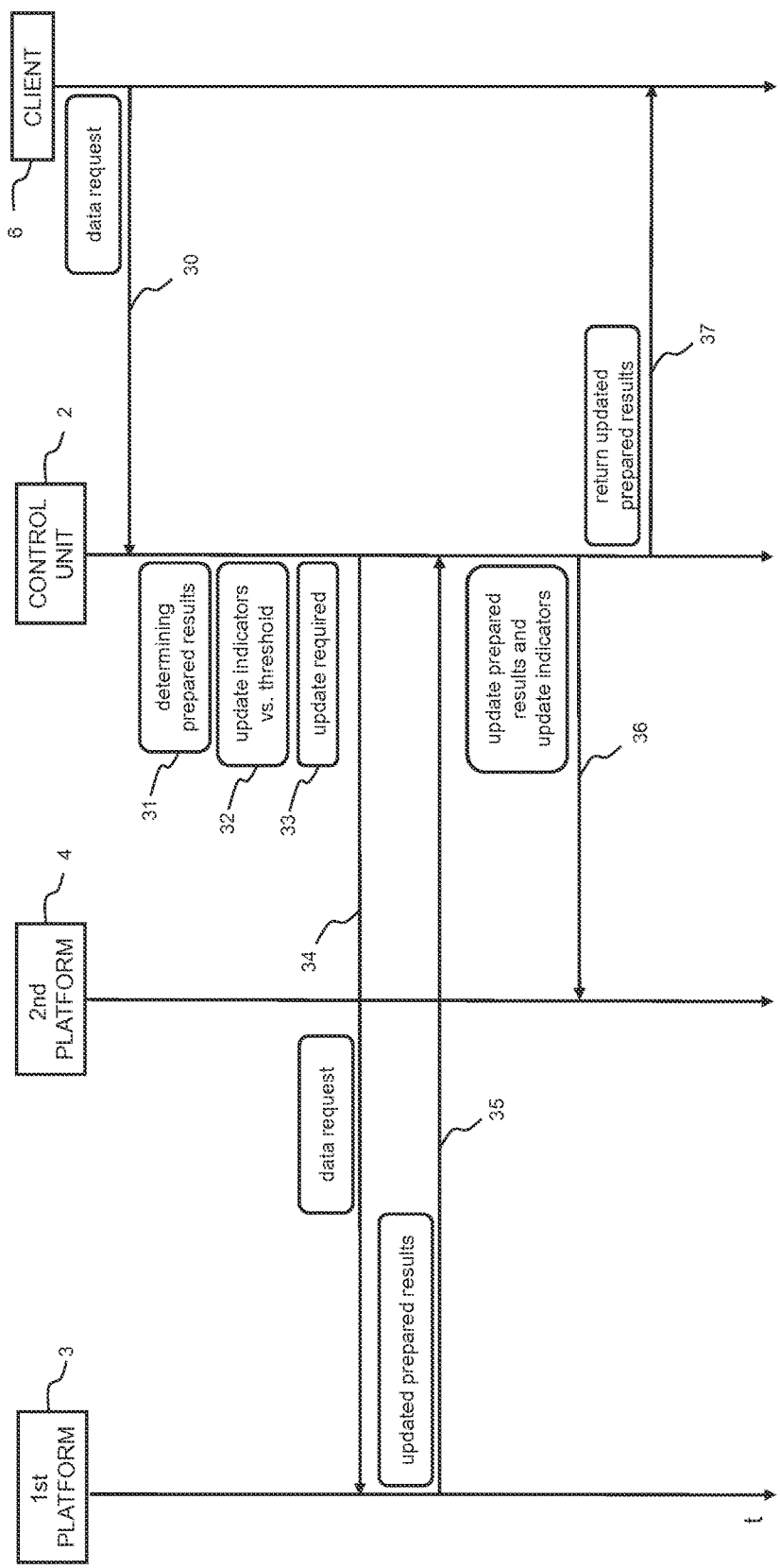
FIGS. 2A and 2B depict a high-level message flow for processing data requests by utilizing update indicators.
Figure 2B:
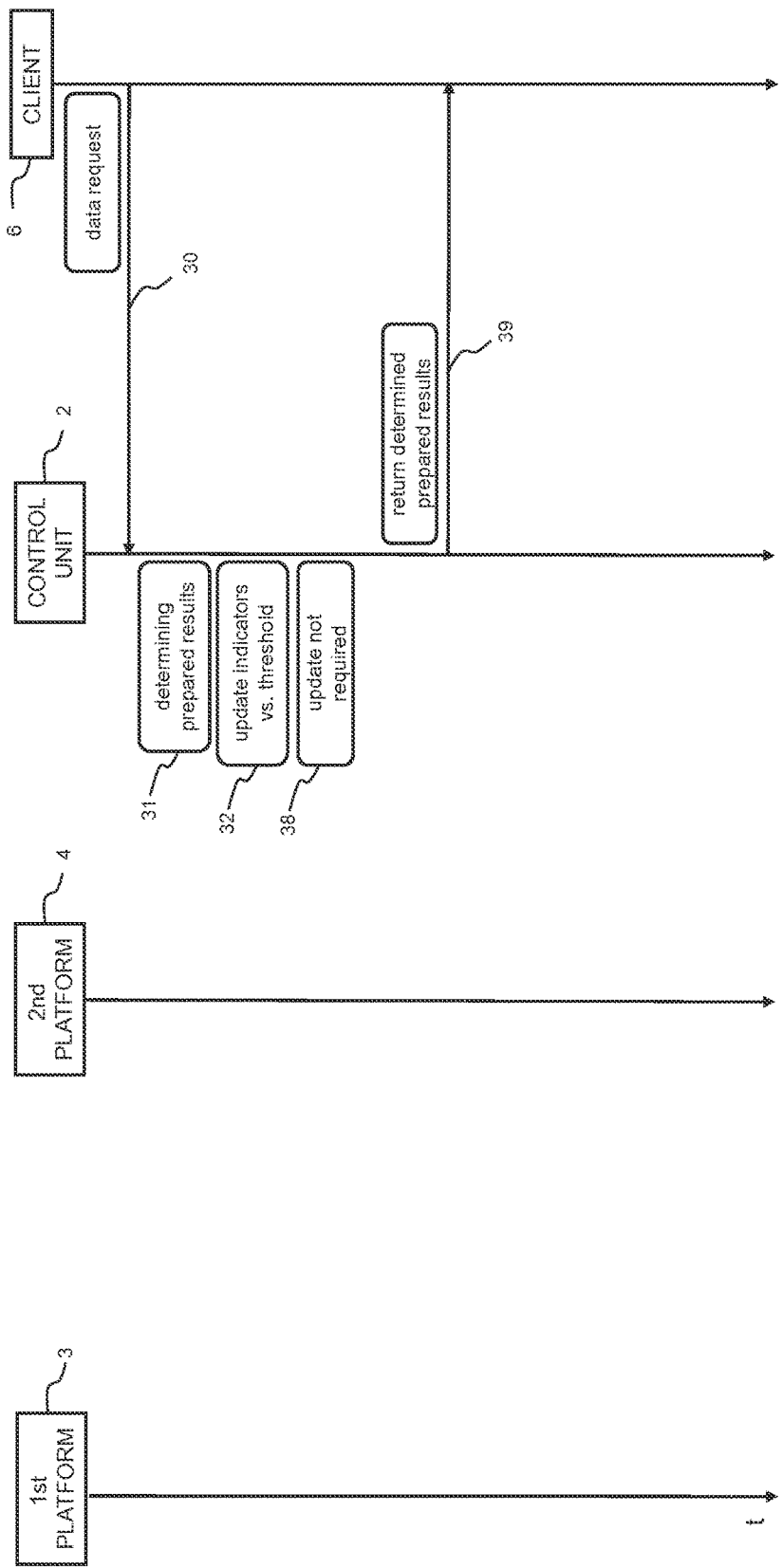

Further on, the control unit 2 compares the update indicators of the determined prepared results with a threshold value (activity 32 in FIG. 2A and FIG. 2B). At a more detailed level, this activity 32 involves a determination of the update indicator values of each of the determined prepared result. To this end, the control unit 2 e.g., retrieves respective control data such as the timestamps of the last update of the determined prepared results e.g., from a control database, calculates the ages t of the determined prepared results, retrieves the validity rates being associated with the determined prepared results, calculates the validity probability acc of the determined prepared results and then computes $(1-acc) \cdot t$ for each of the determined prepared results. The computed values for the update indicator of the determined results are then compared to the threshold value. The threshold value controls the amount of prepared results which are updated via the first platform 3 in response to receiving data requests 30 and the complimentary amount of prepared results which are not updated in response to receiving data requests 30, but returned to the client 6 from the pool 5 of the second platform 4.

Figure 6A:
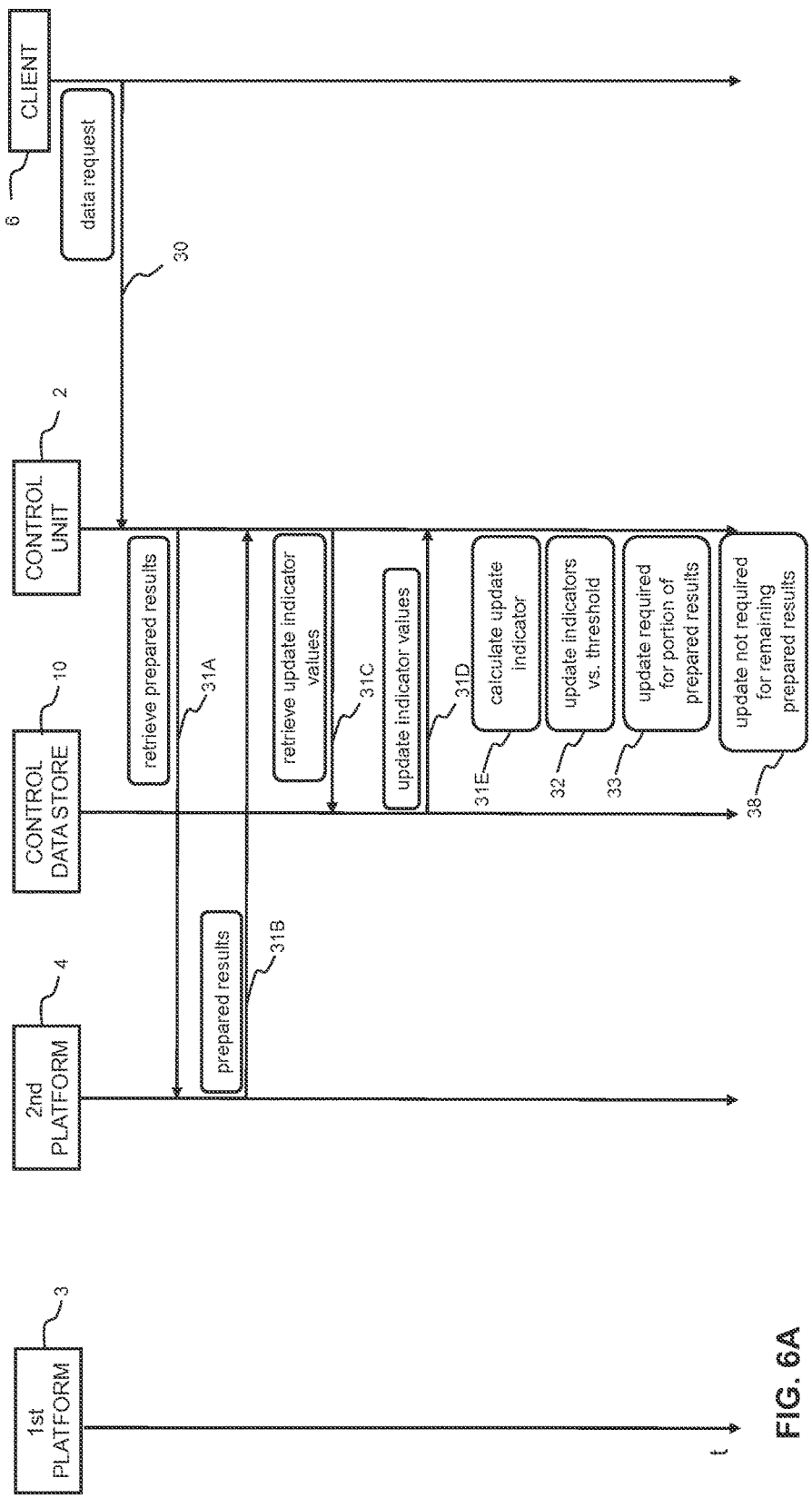
FIGS. 6A and 6B depict another message flow example for processing data requests by utilizing update indicators.
Figure 6B:
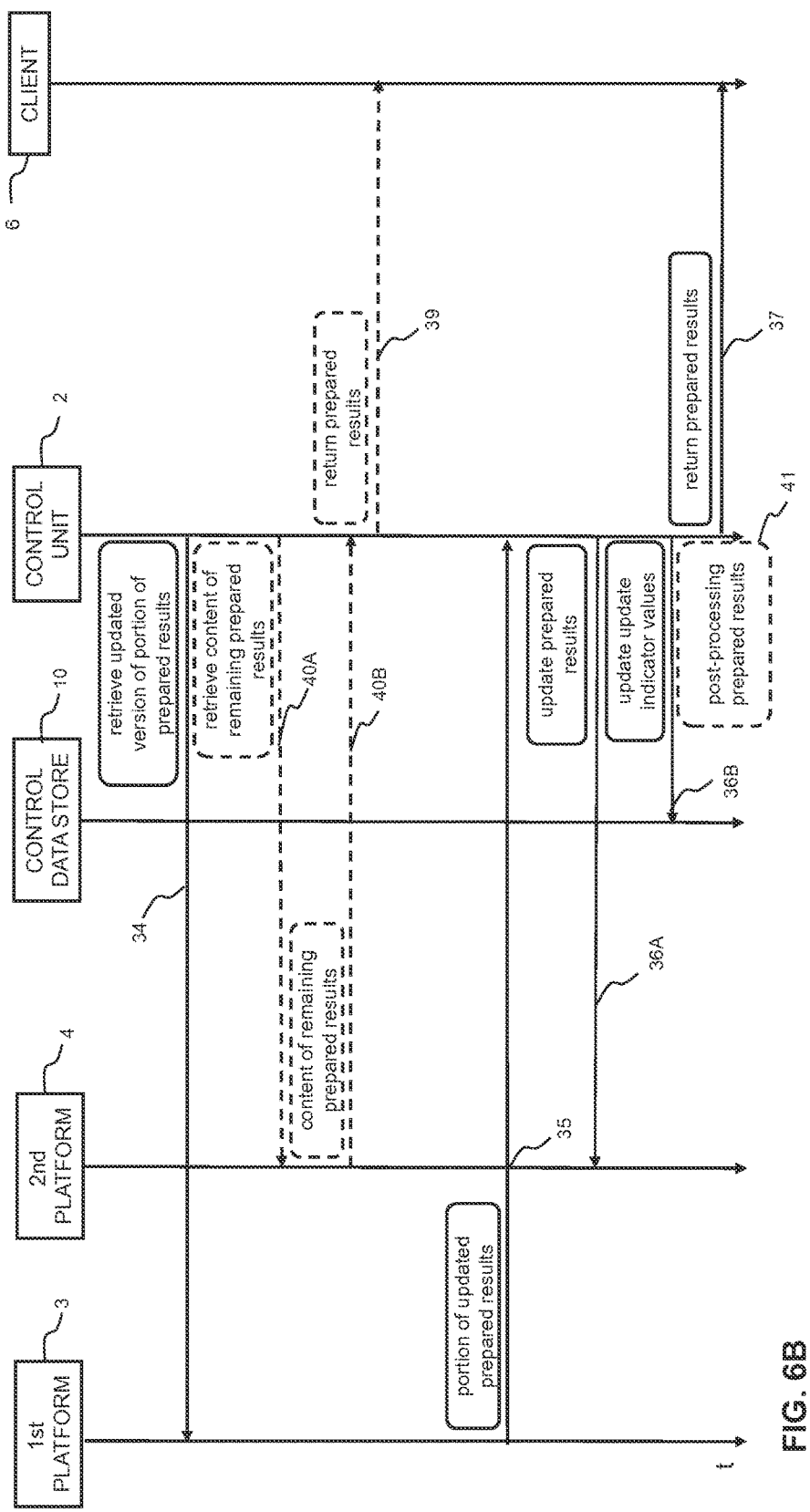

The comparison either indicates a need to update the respective prepared result if the update indicator value exceeds the threshold or the comparison indicates that the respective prepared result does not need to be updated if the update indicator value does not exceed the threshold (for reasons of simplicity, we here assume that the comparison yields the same indications for all of the determined prepared results—in practice, the comparison may also indicate that a portion of the determined prepared results should be updated and the remaining portion of the determined prepared results do not need to be updated; this situation is explained further below with reference to FIGS. 6A and 6B and is also applicable to any other examples described herein).

In the case the comparison indicates a requirement to update the prepared results (box 33 in FIG. 2A), the control unit 2 retrieves updated versions of the determined prepared results from the first platform 3 (e.g., by relaying the data request to the first platform 3) (message 34 in FIG. 2A). The first platform 3 prepares the updated versions of the prepared results and returns these updated versions of the prepared results to the control unit 2. The control unit 2 receives the updated versions of the prepared results from the first platform 3 by message 35. The control unit 2 then updates the determined prepared search result in the pool 5 of the second platform 4 (activity 36 in FIG. 2A). In addition, the control unit 2 also updates the update indicator values associated with the determined prepared results (also activity 36 in FIG. 2A) such as storing the new timestamp of this update of the determined prepared results. Finally, the control unit 2 returns the updated version of the determined prepared results to the client 6 by message 37. Note that activities 36 and 37 may also occur in a different order, i.e., the control unit 2 first returns the prepared results to the client 6 and then updates the prepared results in the second platform and the associated update indicators.

On the other hand, in the case the comparison 32 does not indicate a requirement to update the determined prepared results (box 38 in FIG. 2B), the control unit 2 returns the determined prepared results to the client 6 by message 39, without updating the prepared results by inquiring the first platform 3.

The above basic definition of the update indicator as being given by $(1-acc)\cdot t$ encompasses the technical effect of providing an improved validity of the prepared results in the long run, as will be explained next.

The present inventors have recognized that repeatedly updating such prepared results having a higher validity rate $\lambda_i$ which are regularly outdated by a change of their corresponding underlying original response data or updating such prepared results that yield promote the user accuracy as defined above is non-optimal. Such a strategy is by proposing to update those objects in a cache with the highest product $Pi=Psi(t)\times Pri(h)$, as explained above at the outset. Also focusing on updating prepared results with the best gain-cost ratio being e.g., defined as $$\frac{p_i(1-acc_i)}{c_i}$$

is likewise non-optimal. The present inventors have realized that these strategies only yield short-term increases of the prepared results' accuracy, but might cause an accuracy degradation of the pool 5 in the long run.

On the other hand, the update indicator as proposed herein provides a long-term accuracy increase of the prepared results stored in the second platform 4 by establishing a decision metric to either respond to a data request either with prepared results updated by the first platform 3 (which at the same time update the corresponding prepared results in the second platform 4) or to respond to a data request either with non-updated prepared results being held in the second platform 4 without inquiring the first platform 3 and updating these prepared results in the second platform 4. The long-term accuracy increase effect of the update indicator proposed herein will become apparent to the skilled person from the following explanations.

As explained above, previously known update strategies focus on updating prepared results which are likely to be invalid, i.e., employ an update indicator of $(1-acc_i)$, or refined versions of this such as $$\frac{p_i(1-acc_i)}{c_i}.$$

Further, as also explained above, the computation costs to update a prepared result i by the first platform is denoted as $c_i$. These costs $c_i$ are incurred with each update of the prepared result i by the first platform 3. Thus, if e.g., the prepared result i is updated twice as often as another prepared result over a longer period of time, the accumulated amount of $c_i$ over this longer period of time is twice as high as the accumulated costs for updating the other prepared result during the same period of time. Therefore, the long-term update costs of a prepared result i can be defined by considering the long-term update frequency $f_i$ of the prepared result i (e.g., $f_i=20$ updates of i within 120 hours=⅙ or $f_i=6$ updates of i within 120 hours=1/20)

Long Term Update Costs$_i=c_i\times f_i$.

Considering these long-term update costs leads to the insight that prepared results should be updated in a way providing the highest accuracy gain at the lowest long-term update costs, i.e., with the highest $$\frac{1-acc_i}{\text{Long term Cost}_i} = t\frac{1-acc_i}{c_i f_i}.$$

The actual long-term update frequency $f_i$ is generally unknown, but can be approximated by the following consideration: If, in response to a data request 30, it is decided to update a given prepared result i which has not been refreshed for a time period of $t_i$, the long-term update frequency of this prepared result i is assumed to be $$\frac{1}{t_i}.$$

This will actually become true if the decision to update the prepared result i is indeed by taken. In other words, $$\frac{1}{t_1}$$

is considered as a potential long-term update frequency of the prepared result i. For this reason, the ratio $$\frac{c_i}{t_i}$$

can be used as an estimation of the long-term update costs of a given prepared result i. In general, a long-term accuracy optimization of the prepared result stored in the pool 5 of the second platform 4 should therefore update the prepared results with the highest $$\frac{(1-acc_i)}{c_i}t_i.$$

This definition of the update indicator can still be generalized when assuming that the update cost $c_i$ is equal and constant for all prepared results and the update costs constraint is e.g., only employed to limit the number of updates of prepared results per unit of time via the first platform 3. In this case, the factor $c_i$ can be removed from the update indicator resulting in the definition of the update indicator as introduced above, i.e., $(1-acc_i)\cdot t_i$.

As also briefly indicated above, further refinements of this update indicator are possible, e.g., when additionally considering the popularity of prepared results, i.e., the user accuracy:

$$\frac{p_i(1-acc_i)}{c_i}t_i$$

or $p_i(1-acc_i)\cdot t_i$.

Furthermore, $acc_i$ may be replaced by the specifically employed probabilistic model modeling the validity of prepared results decreasing over time, such as $acc_i = e^{-\lambda_i t_i}$ as deduced further above. This results in more specific version of the update indicator definitions, namely $$(1 - e^{-\lambda_i t_i}) t_i$$

or $$\frac{(1 - e^{-\lambda_i t_i})}{c_i} t_i$$

or $$p_i (1 - e^{-\lambda_i t_i}) t_i$$

or $$\frac{p_i (1 - e^{-\lambda_i t_i})}{c_i} t_i$$

Figure 4:
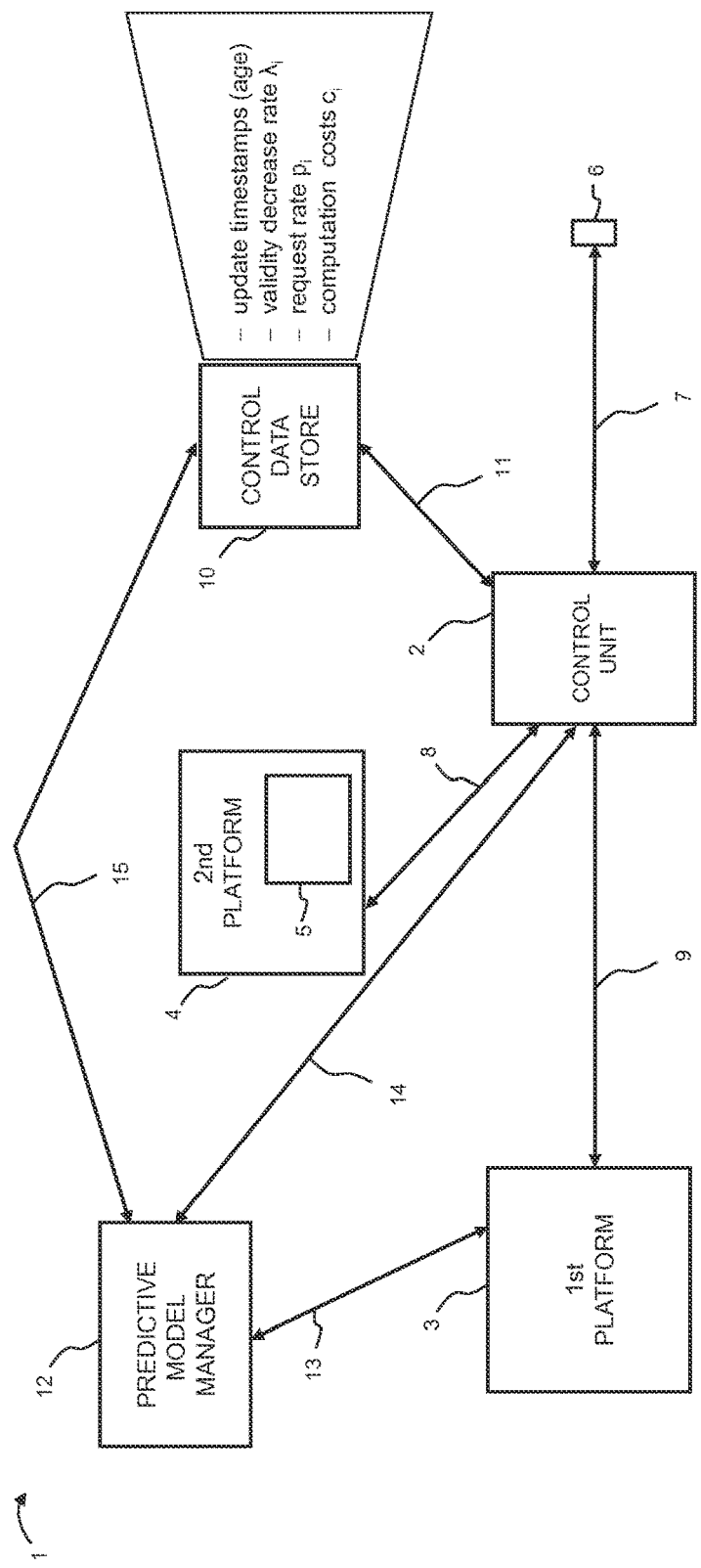
FIG. 4 is an exemplary system architecture of the database environment.

FIG. 4 present a more specific example of a database environment 1. This example differs from the more general architecture shown by FIG. 1 in that it includes certain additional components, namely the control data store 10 and the predictive model manager 12. The control data store 10 is connected to the control unit 2 via interface 11 and to the predictive model manager via interface 15. The predictive model manager is connected to the first platform 3 via interface 13, to the control unit 2 via interface 14 and to the control data store via interface 15.

In some embodiments, the control data store 10 stores data to compute the update indicator for given prepared results stored in the pool 5 of the second platform 4. In particular, the control data store 10 stores timestamps indicating the last update time of the prepared results in order to compute the age $t_i$ at a given point of time. Optionally, the control data store 10 stores data to model the probability for prepared results maintained in the pool 5 of the second platform 4 to be accurate, for example the validity rates $\lambda_i$ of the prepared results in order to compute $acc_i = e^{-\lambda_i t_i}$ at a given point of time. Optionally, the control data store 10 further stores additional control data utilized to determine the values of the various examples of the update indicator as described above, e.g., the request rate (popularity) $p_i$ of the prepared results stored in the pool 5 of the second platform 4 and/or the computation costs $c_i$ to update prepared results. The control data kept by the control data store 10 is associated with the prepared results stored maintained in the pool 5 of the second platform 4. Thus, the control data stored 10 also stores identification information of the prepared results in order to associate the control data with the prepared results. For example, a database record of the control data store 10 is defined as follows:

(identification of prepared result i, last update time of i, $\lambda_i$, $p_i$, $c_i$)

The identification of the prepared results utilized in the control data store 10 is, for example, the primary key values of the prepared results as stored in the pool 5 of the second platform 4.

In some embodiments, the control data store 10 is an integrated part of the control unit 2. In other embodiments, the control data store 10 is an integrated part of the second platform 4. In this case, the control data maintained by the control data store 10 is e.g., stored in a database table being associated with the database table(s) of the prepared results in the pool 5. In still other embodiments, the control data store is a stand-alone component (e.g., realized by a dedicated server system).

The predictive model manager 12 is arranged to update certain control data stored by the control data store, such as the validity rates $\lambda_i$, the popularity $p_i$, and the update costs $c_i$. In order to determine current values for these parameters, the predictive model manager 12 receives input data from the first platform 3 and from the control unit 2. More specifically, the first platform 3 transmits information about the updated prepared results (the updates occurring in response to messages 34 (FIG. 2A)) to the predictive model manager 12, i.e., which results have been updated at which time and whether or not the updates led to a different content of the updated results. The first platform 3 also transmits information regarding the computation costs to update prepared results to the model manager 12 (these information are determined by the first platform itself by monitoring the updates of the various prepared results and the update costs involved and/or from log information received from an original source of the prepared results such as webservers). The control unit 2 transmits information about incoming data requests 30 and the prepared results requested by the data requests 30 to the predictive model manager 12, e.g., which prepared results were returned to inquiring clients at which times. In some embodiments, this input communication from the first platform 3 and/or from the control unit 2 to the predictive model manager 12 occurs asynchronously from processing and serving data requests 30 as visualized by FIGS. 2A, 2B, 5A, 5B, 6A and 6B. In other embodiments, the first platform 3 transmits the information about an updated prepared result to the predictive model manager 12 synchronously with the update, e.g., immediately after the first platform 3 has returned the updated result to the control unit 2. In such embodiments, also the control unit 2 may transmit the information about incoming data requests 30 and respective returned results to clients 6 to the predictive model manager 12 synchronously with the processing of the data requests 30, e.g., immediately after the control unit 2 has returned the corresponding results to the inquiring client 6.

The predictive model manager 12 processes these inputs from the first platform 3 and the control unit 2 and provides current control information resulting from the processing to the control data store 10. More specifically, the predictive model manager 12 utilizes the information about the updated prepared results received from the first platform 3, encompassing at least the information whether or not an update of a prepared result by the first platform led to a change of the content of the prepared result and a timestamp of the update, to maintain validity rates $\lambda_i$ for each of the prepared results stored in the pool 5 of the second platform 4. The predictive model manager 12 utilizes the information about the computational costs received from the first platform 3 to maintain the parameters $c_i$ for each prepared result i stored in the pool 5 of the second platform 4. The predictive model manager 12 utilizes the information about the incoming data requests 30 received from the control unit 2 and correspondingly requested prepared results in order to maintain the popularity values $p_i$ for each of the prepared results stored in the pool 5 of the second platform 4. The resulting current values of $\lambda_i$, $p_i$ and/or $c_i$ are transmitted from the predictive model manager to the control data store 10 and are thus made available to the control unit 2 in order to determine the update indicator values in the course of processing incoming data requests 30 (activity 31). Updates of the current values of $\lambda_i$, $p_i$ and/or $c_i$ are sent by the predictive model manager 12 to the control data store in regular intervals and/or on demand, i.e., when values of control data have been changed.

In some embodiments, the predictive model manager 12 and/or the control data store 10 employ a distributed batch framework utilizing e.g., Apache Hadoop® enabling both components to execute intensive computing processes with large amounts of data (e.g., in the order of PetaBytes) on server clusters.

Figure 5A:
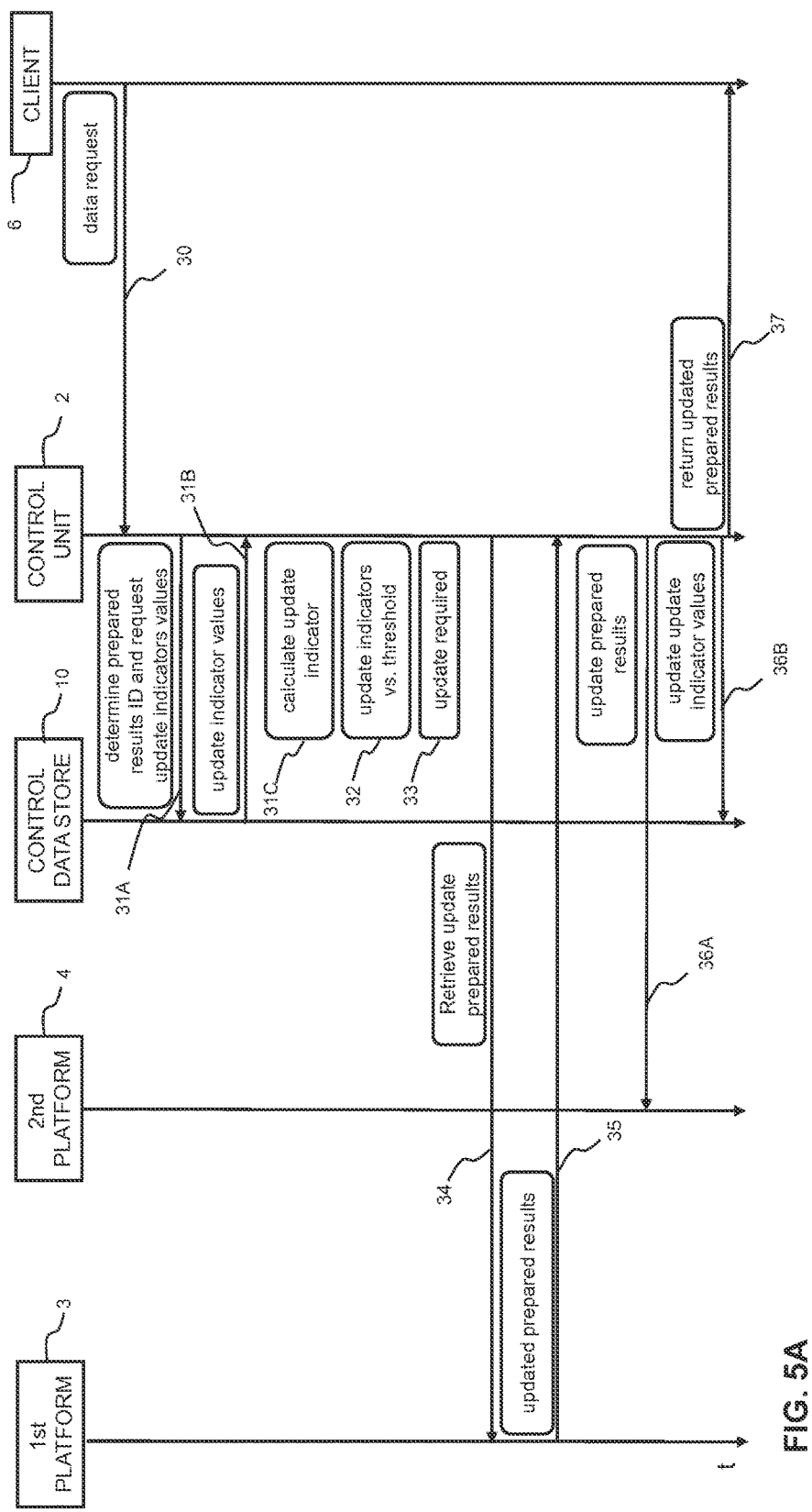
FIGS. 5A and 5B depict a more specific message flow example for processing data requests by utilizing update indicators.
Figure 5B:
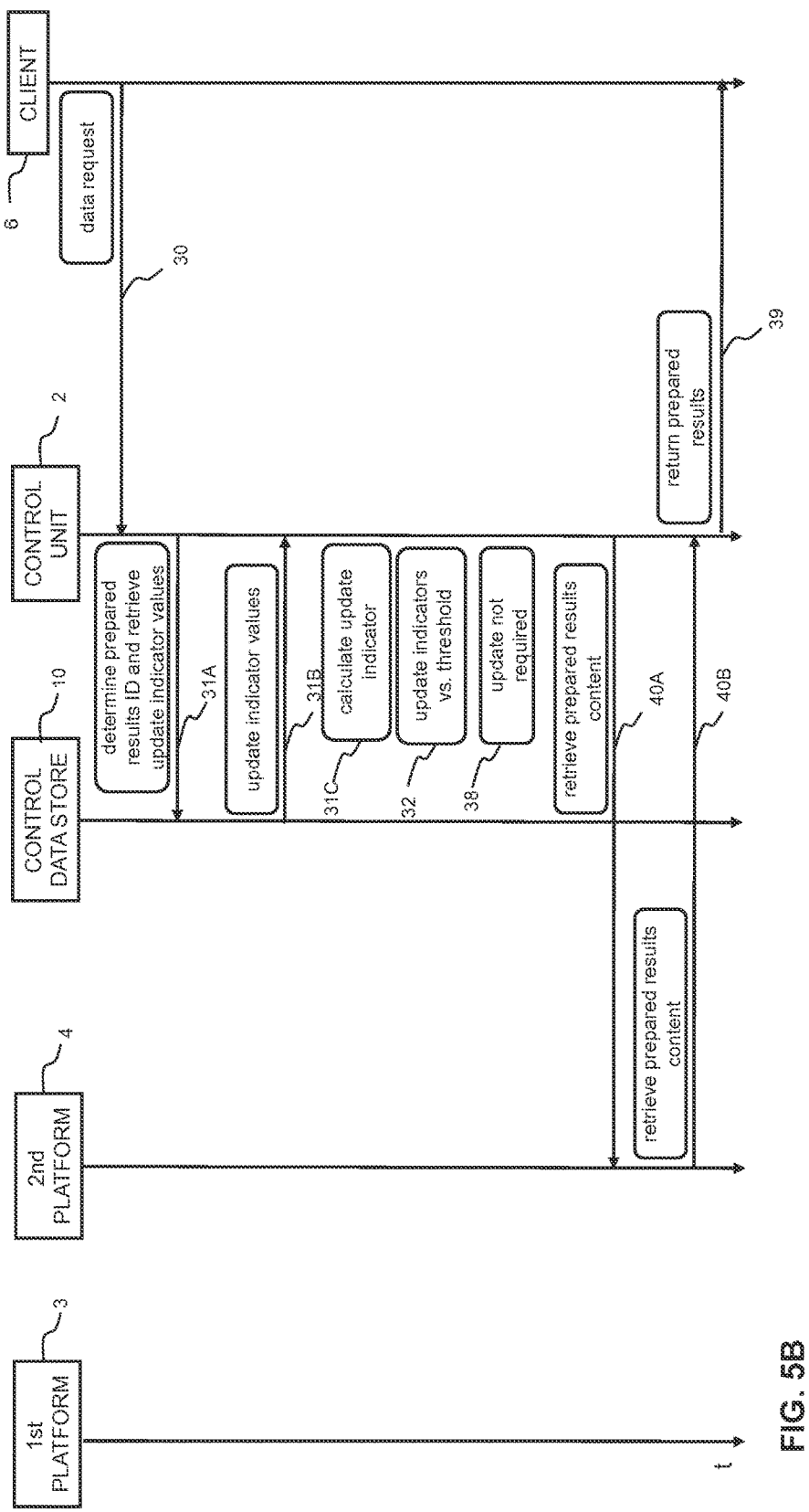

Exemplary message sequences occurring in the exemplary architecture of FIG. 4 are shown by FIGS. 5A and 5B. Similar to FIGS. 2A and 2B, FIG. 5A shows the variant in which the update indicator values of the prepared results to be returned to the client 6 indicate a need to update the prepared results and FIG. 5B shows the variant in which the update indicator values of the prepared results to be returned to the client 6 do not indicate a need to update the prepared results.

In both variants, the process begins with a transmission of a data request 30 from the client 6 to the control unit 2. In response to receiving the data request 30, the control unit 2 determines identification information (e.g., primary key values) of prepared results which fulfill criteria included in the data request 30 and associated update indicator values (activity 31A). As a simple example, the data request 30 requests the number of available seats in the flight LH123 on 1 Jul. 2015. In response to receiving this data request 30, the control unit 2 utilizes the key "LH123-1JUL15" already included in the request to retrieve the last update time of the prepared result LH123-1JUL15-42 (i.e., the prepared result indicates 42 free seats, wherein the number 42 of available seats is not known to the control unit 2 at that stage) and the validity rate $\lambda_{LH123\text{-}1JUL15}$ from the control data store 10. The control data store 10 responds with respective values of the update timestamp and validity rate $\lambda_{LH123\text{-}1JUL15}$ (activity 31B in FIGS. 5A and 5B). The control unit 2 then calculates the update indicator of the prepared result LH123-1JUL15-42 (activity 31C in FIG. 5A and FIG. 5B) by calculating the age $t_{LH123\text{-}1JUL15}$ (last update timestamp of LH123-1JUL15-42 minus current time) and then calculating $(1-e^{-\lambda_i t_i})t_i$.

The control unit 2 then performs the comparison of the calculated update indicator value with the threshold value (activity 32 in FIG. 5A and FIG. 5B). If the comparison indicates a need to update the LH123-1JUL15-42 (box 33 in FIG. 5A), the control unit 2 retrieves an updated version of the prepared result from the first platform 3 (activity 34 in FIG. 5A). In an embodiment, the first platform itself is an original inventory of available flight seats and returns the update value (e.g., LH123-1JUL15-23, i.e., 23 free seats) to the control unit 2 on the basis of its own inventory data. In another embodiment, the first platform 3 retrieves the requested current available seat information from further sources and returns the updated prepared result LH123-1JUL15-23 to the control unit 2 afterwards (activity 35 in FIG. 5A). The control unit 2, after having received the updated prepared result from the first platform 3, returns the updated prepared result to the client 6 (activity 37 in FIG. 5A), updates the prepared result in the pool 5 of the second platform 4 (e.g., by replacing the previous outdated value 42 with the updated, current value 23, activity 36A) and also updates the last update timestamp of LH123-1JUL15 in the control data store 10 (activity 36B). Note that activities 36A, 36B and 37 may occur in any order.

Alternatively, the comparison between the current update indicator value of LH123-1JUL15 and the threshold conducted by control unit 2 (activity 32) indicates that an update of LH123-1JUL15 is not necessary (box 38 in FIG. 5B). In this case, the control unit 2 retrieves the value of LH123-1JUL15 (e.g., 42 available seats) from the pool 5 of the second platform 4 (activity 40A in FIG. 5B) and returns this value as a response to data request 30 to the client 6 (activity activity 39).

In other embodiments, depending on the content and definition of the prepared results and criteria included in the data request 30, activity 31 is more complex (FIGS. 6A and 6B) e.g., because the key values of the prepared results in which the client 6 is interested are not included in the data request 30 and, thus, a search may be required to determine which prepared results fulfill the search criteria included in the data request 30. For example, the prepared results stored by the pool 5 specify pre-computed priced travel recommendations and the data request 30 e.g., asks for the cheapest travels between Frankfurt and Boston with a departure between 1 Jul. 2015 and 10 Jul. 2015 and a stay duration between 11 and 15 days. In scenarios of this type, in some embodiments, the control unit 2 first identifies prepared results stored in the pool 5 of the second platform 4 which fulfill search criteria of the data request 30. Thus, in these embodiments, activity 31A (FIG. 6A) is an inquiry of the control unit 2 to the second platform 4 in order to retrieve identification information of prepared results complying with the search criteria included in the data request 30. Referring to the latest example, the second platform 4 e.g., returns all travel recommendations stored in the pool 5 for travels between Frankfurt and Boston with a departure between Jul. 1, 2015 and Jul. 10, 2015 and a stay duration between 11 and 15 days (activity 31B in FIG. 6A).

The control unit 2 then determines the update indicator values for all identified prepared results in the manner described above (retrieving the respective control data from the control data store 10 by activities 31C and 31D in FIG. 6A and calculating the update indicator values by activity 31E in FIG. 6A) and performs the comparison between update indicator value and threshold for each identified prepared result (activity 32 in FIG. 6A). For all prepared results for which the comparison indicates a need to update the respective prepared result (box 33 in FIG. 6A), the control unit 2 retrieves an updated version of the respective prepared result from the first platform 3 (activities 34 and 35 in FIG. 6B). Optionally, as regards the remaining prepared results for which the comparison between update indicator and threshold value does not indicate a need to update, the control unit 2 retrieves the content of these not-to-be-updated prepared results from the second platform 4 (activities 40A and 40B in FIG. 6B; this applies if the control unit 2 has not already retrieved the content of all the prepared results fulfilling the search criteria with activities 31A and 31B beforehand). After having received the updated versions of the prepared results in response to request 34 (activity 35), the control unit 2 stores the updated prepared results in the pool 5 of the second platform 4 (activity 36A in FIG. 6B), updates the update timestamps of the updated prepared results in the control data store 10 (activities 36B in FIG. B), optionally post-processes the prepared results retrieved from the second platform 4 and the updated versions of the prepared results retrieved from the first platform 3 (activity 41 in FIG. 6B), which is e.g., a determination of a subset of prepared results out of the updated prepared results and the not-updated prepared results determined before to be returned to the client 6 (in the above example, selecting the most inexpensive travel recommendation), and returns these results to the client 6 (activity 37 in FIG. 6B).

In some embodiments, still different message flows are employed, depending on the particular characteristics of the database model(s) employed by the database environment 1 and structure and criteria included in the data requests 30. For example, in some embodiments, post-processing of prepared results (activity 41 in FIG. 6A) is not employed, but all the prepared results retrieved from the second platform 4 and all updated versions of the prepared results retrieved from the first platform 3 are returned to the client 6. In such embodiments, the prepared results retrieved from the second platform 4 are already returned to the client 6 as soon as they are available (activity 39 in FIG. 6B) which is generally earlier than retrieval of the updated versions of the prepared results from the first platform 3 concludes (because updating prepared results by the first platform generally requires substantially more time than retrieving prepared results from the second platform 4, as explained in detail above). Hence, in this situation, activity 37 of FIG. 6B then only encompasses returning the updated versions of the prepared results retrieved from the first platform 3.

In some embodiments, the message flow shown in FIGS. 6A and 6B is also adapted in that the post-processing activity 41 is performed already at an earlier stage, for example by the control unit 2 after having received the content of the prepared results with activity 31B or by the second platform 4 before returning the prepared results (or at least their identities) with activity 31B. Again referring to the above example of returning the cheapest travel recommendation for travels between Frankfurt and Boston with a departure between Jul. 1, 2015 and Jul. 10, 2015 and a stay duration between 11 and 15 days, in some embodiments, the second platform 4 is arranged to determine a limited number of the most inexpensive travel recommendations for travels between Frankfurt and Boston with a departure between Jul. 1, 2015 and Jul. 10, 2015 and a stay duration between 11 and 15 days (as opposed to returning all priced travel recommendations for travels between Frankfurt and Boston with a departure between Jul. 1, 2015 and Jul. 10, 2015 and a stay duration between 11 and 15 days stored in the pool 5). For example, with activity 31B in FIG. 6B, the second platform 4 returns only the five cheapest travel recommendations. The subsequent activities of the control unit 2 (activities 31C, 31D, 31E, 32-38) are then limited to only these five retrieved prepared results and are performed in the same manner as described above.

In some embodiments, the threshold value is dynamically adapted depending on the load of the first platform 3. In this way, by using the adaptive threshold value, the amount of prepared results which are updated via the first platform 3 and therefore the load of the first platform are controlled. If the load of the first platform 3 is too high (too many prepared results are updated via the first platform 3 in a given time unit) and the load is to be reduced, the threshold value is increased with the effect that the portion of prepared results which are updated via the first platform 3 is decreased and the portion of prepared results which are retrieved from the second platform 4 and returned to the client 6 without update is increased. If, on the other hand, the first platform 3 has free resources which can be utilized to update more prepared results in a given time unit than currently updated, the threshold value is decreased with the effect that the portion of prepared results which are updated via the first platform 3 is increased and the portion of prepared results which are retrieved from the second platform 4 and returned to the client 6 without update are decreased.

Figure 7:
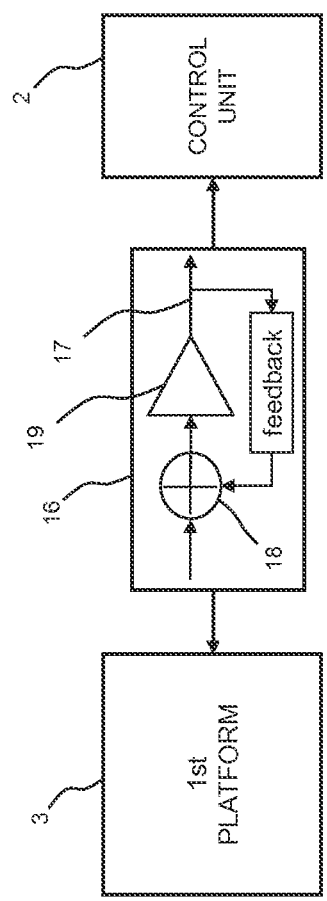
FIG. 7 visualizes a feedback loop between the first platform and the control unit in order to dynamically adapt the threshold value.

In some embodiments, dynamically adapting the threshold value is realized by maintaining a feedback control loop 16 between the first platform 3 and the control unit 2 (FIG. 7). The feedback control loop 16 is defined by three variables, namely the control value 17, the setpoint 18 and the actuating variable 19. The control value 17 is the variable to be controlled (to be kept constant at a given target level) and is therefore defined by a current actual load factor of the first platform 3. The setpoint 18 of the feedback control loop 16 is given by a desired target load factor of the first platform 3. The actuating variable of the feedback control loop 16 is the threshold value which impacts the actual load factor of the first platform, i.e., controls the control value 17.

In some embodiments, the feedback control loop 16 is realized by the first platform 3 and the control unit 2 communicating with each other in regular intervals as follows. The first platform regularly compares the current actual load factor 17 with the desired target load factor 18. If the current actual load factor 17 is N % higher than the desired target load factor 18 (e.g., 10%), the threshold value is increased by a ratio N/B % (e.g., 10% divided by 2=5%) wherein B is a smoothing avoiding overreactions of the dynamic threshold value adaption and enabling a smooth convergence between the current load 17 and the target load 18. As a result of the decreased threshold value, the current actual load factor 17 will decrease. If, on the other hand, the current actual load factor 17 is below the desired target load factor 18 by N %, the threshold value is decreased by N/B %, resulting in a higher amount of prepared results being updated with the first platform 3 and, thus, increasing the current actual load factor 17.

Figure 8:
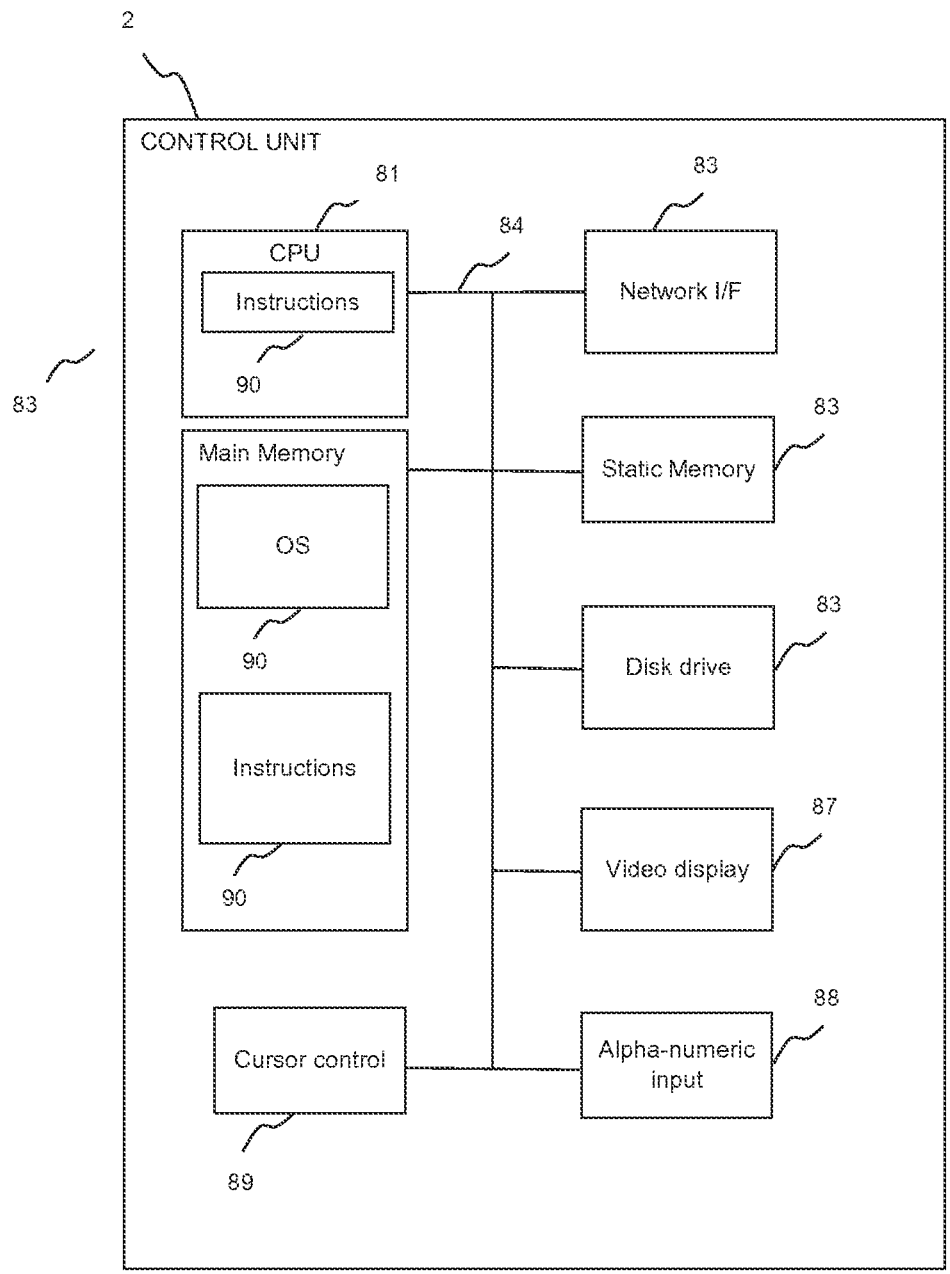
FIG. 8 is an example for an inner structure of a control unit.

Finally, FIG. 8 is a diagrammatic representation of a computer system which provides the functionality of the control unit 2. Within the control unit 2, a set of instructions, to cause the computer system to perform any of the methods discussed herein, are executed. The control unit 2 includes a processor 81, a main memory 82 and a network interface device 83, which communicate with each other via a bus 84. Optionally, the control unit 2 further includes a static memory 85 and a disk-drive unit 86. A video display 87, an alpha-numeric input device 88 and a cursor control device 89 may form a user interface for e.g., an administrator to control the control unit 2.

The network interface device 83 connects the control unit 2 to the first platform 3 via the interface 9 and to the second platform 4 via the interface 8. The network interface device 83 also connects the control unit 2 to the clients 6 via interface 7. A set of instructions (i.e., software) 90 embodying any one, or all, of the methods described above, resides completely, or at least partially, in or on a machine-readable medium, e.g., the main memory 82 and/or the processor 81. A machine-readable medium on which the software 90 resides may also be a non-volatile data carrier (e.g., a non-removable magnetic hard disk or an optical or magnetic removable disk) which is part of disk-drive unit 86. The software 90 may further be transmitted or received as a propagated signal e.g., via the Internet or any other network through the network interface device 83. Basic operation of the control unit 2 including user interface and network communication is controlled by operating system 91.

The present approach to control routing of incoming data requests by the control unit to the first platform and or to the second platform on the basis of the update indicator (1−acc) ·t being compared with the threshold value provides an improved the long-term validity of prepared results maintained in the pool of the second platform. This approach allows to optimally determine which prepared results to be returned in response to data requests are to be retrieved from the first platform and thereby updated in the second platform. In this way, an ineffective focus on repeatedly updating very volatile prepared result is avoided, thereby improving the accuracy/validity of the prepared results in the long run.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A control unit for handling data requests directed to a database environment, the control unit being coupled to a first platform providing original results to be stored in a second platform as prepared results, the second platform having a lower response time than the first platform and maintaining a pool of the prepared results in order to be returned in response to the data requests, wherein each prepared result maintained by the second platform is associated with an update indicator, the control unit comprising:

one or more processors; and
a memory coupled to the one or more processors, the memory including program code that, when executed by at least one of the one or more processors, causes the control unit to:
receive a data request;
determine at least one prepared result corresponding to the data request;
compare the update indicator of the at least one prepared result corresponding to the data request with a threshold value defined for the pool of the prepared results, wherein the threshold value is dynamically adapted depending on a load of the first platform relating to a number of accesses to the first platform per unit of time;
in response to the control unit determining that the comparison indicates a requirement to update the prepared result,
retrieve, from the first platform, an updated version of the at least one prepared result,
update the prepared result in the pool of the second platform and the associated update indicator based on the updated version of the at least one prepared result, and
return the updated version of the at least one prepared result and
in response to the control unit determining that the comparison does not indicate a requirement to update the at least one prepared result, return the at least one prepared result,
wherein the update indicator is based on a probability that the associated prepared result is valid and an age of the associated prepared result.

2. The control unit of claim 1, wherein the update indicator is further based on an access frequency of the associated prepared result from the database environment.

3. The control unit of claim 1, wherein the update indicator is further based on a measure for computation resources of the first platform needed to prepare the updated version of the associated prepared result.

4. The control unit of claim 1, wherein the update indicator is further based on an access frequency of the associated prepared result from the database environment and a measure for computation resources of the first platform needed to prepare the updated version of the associated prepared result.

5. The control unit of claim 1, wherein the program code, when executed by at least one of the one or more processors, further causes the control unit to:
query a control data store based on key information identifying the at least one prepared result; and
receive, from the control data store, control data specifying the update indicator associated with the at least one prepared result.

6. The control unit of claim 5, wherein the program code causes the control unit to determine the at least one prepared result corresponding to the data request by:
querying the second platform for the at least one prepared result responsive to the data request; and
receiving the at least one prepared result from the pool of the prepared results of the second platform.

7. The control unit of claim 2, wherein the program code causes the control unit to determine the at least one prepared result by:
relaying the data request to the second platform; and
receiving, from the second platform, the at least one prepared result responsive to the data request.

8. The control unit of claim 7, wherein the program code causes the control unit to determine the at least one prepared result by:
retrieving the update indicator associated with the at least one prepared result received from the second platform.

9. The control unit of claim 1, wherein the at least one prepared result corresponding to the data request includes a first prepared result and a second prepared result, and the program code, when executed by at least one of the one or more processors, further causes the control unit to:
determine that the comparison indicates a requirement to update the first prepared result, but does not indicate a requirement to update the second prepared result;
retrieve the updated version of the first prepared result from the first platform;
update the first prepared result in the pool of the second platform and the associated update indicator based on the updated version of the first prepared result; and
return the updated version of the first prepared result and the second prepared result.

10. The control unit of claim 1, wherein the program code, when executed by at least one of the one or more processors, further causes the control unit to:
maintain a feedback control loop between the first platform and the control unit,
wherein a control value of the feedback control loop is defined by a load factor of the first platform, a setpoint of the feedback control loop is given by a target load factor of the first platform, and an actuating variable of the feedback control loop is given by the threshold value.

11. A method for handling data requests directed to a database environment, the database environment comprising a first platform providing original results to be stored in a second platform as prepared results, the second platform having a lower response time than the first platform and maintaining a pool of the prepared results in order to be returned in response to the data requests, and a control unit for processing the data requests directed to the database environment, wherein each prepared result maintained in the pool of the second platform is associated with an update indicator, the method comprising:
receiving, by the control unit, a data request;
determining, by the control unit, at least one prepared result corresponding to the data request;
comparing, by the control unit, the update indicator of the at least one prepared result corresponding to the data request with a threshold value defined for the pool of the prepared results, wherein the threshold value is dynamically adapted depending on a load of the first platform relating to a number of accesses to the first platform per unit of time;
in response to the control unit determining that the comparison indicates a requirement to update the prepared result:
retrieving, by the control unit from the first platform, an updated version of the at least one prepared result,
updating, by the control unit, the prepared result in the pool of the second platform and the associated update indicator based on the updated version of the at least one prepared result, and
returning, by the control unit, the updated version of the at least one prepared result; and
in response to the control unit determining that the comparison does not indicate a requirement to update the at least one prepared result, returning, by the control unit, the at least one prepared result, wherein the update indicator is based on a probability that the associated prepared result is valid and an age of the associated prepared result.

12. The method of claim 11, wherein the update indicator is further based on an access frequency of the associated prepared result from the database environment.

13. The method of claim 11, wherein the update indicator is further based on a measure for computation resources of the first platform needed to prepare the updated version of the associated prepared result.

14. The method of claim 11, wherein the update indicator is further based on an access frequency of the associated prepared result from the database environment and a measure for computation resources of the first platform needed to prepare the updated version of the associated prepared result.

15. The method of claim 11, further comprising:
querying, by the control unit, a control data store based on key information identifying the at least one prepared result; and
receiving, by the control unit from the control data store, control data specifying the update indicator associated with the at least one prepared result.

16. The method of claim 15, wherein determining the at least one prepared result corresponding to the data request comprises:
querying, by the control unit, the second platform for the at least one prepared result responsive to the data request; and
receiving, by the control unit, the at least one prepared result from the pool of the prepared results of the second platform.

17. The method of claim 11, wherein determining the at least one prepared result corresponding to the data request comprises:
relaying, by the control unit, the data request to the second platform; and
receiving, by the control unit from the second platform, the at least one prepared result responsive to the data request.

18. The method of claim 17, further comprising:
retrieving, by the control unit, the update indicator associated with the at least one prepared result received from the second platform.

19. The method of claim 11, wherein the at least one prepared result corresponding to the data request includes a first prepared result and a second prepared result, and the method further comprises:
determining, by the control unit, that the comparison indicates a requirement to update the first prepared result, but does not indicate a requirement to update the second prepared result,
retrieving, by the control unit, the updated version of the first prepared result from the first platform;
updating the first prepared result in the pool of the second platform and the associated update indicator based on the updated version of the first prepared result; and
returning the updated version of the first prepared result and the second prepared result.

20. The method of claim 11, further comprising:
maintaining a feedback control loop between the first platform and the control unit,
wherein a control value of the feedback control loop is defined by a load factor of the first platform, a setpoint of the feedback control loop is given by a target load factor of the first platform, and an actuating variable of the feedback control loop is given by the threshold value.

21. A computer program product comprising:
a non-transitory computer-readable storage medium; and
program code stored on the non-transitory computer-readable storage medium that, when executed by one or more processors of a control unit, causes the control unit to handle data requests, the control unit being coupled to a first platform providing original results to be stored in a second platform as prepared results, the second platform having a lower response time than the first platform and maintaining a pool of the prepared results in order to be returned in response to the data requests, and a control unit for processing the data requests directed to a database environment, wherein each prepared result maintained by the second platform is associated with an update indicator, the data requests handled by:
receiving a data request;
determining at least one prepared result corresponding to the data request;
comparing the update indicator of the at least one prepared result corresponding to the data request with a threshold value defined for the pool of the prepared results, wherein the threshold value is dynamically adapted depending on a load placed on processing resources or memory resources of the first platform relating to a number of accesses to the first platform per unit of time;
in response to the control unit determining that the comparison indicates a requirement to update the prepared result,
retrieving, from the first platform, an updated version of the at least one prepared result,
updating the prepared result in the pool of the second platform and the associated update indicator based on the updated version of the at least one prepared result, and
returning the updated version of the at least one prepared result; and
in response to the control unit determining that the comparison does not indicate a requirement to update the at least one prepared result, returning the at least one prepared result,
wherein the update indicator is based on a probability that the associated prepared result is valid and an age of the associated prepared result.

* * * * *